(12) United States Patent
Sofussen et al.

(10) Patent No.: US 9,467,025 B2
(45) Date of Patent: Oct. 11, 2016

(54) DISPLAY OPERATION CONDITIONS OF ELECTRIC MOTOR

(71) Applicant: GRUNDFOS HOLDING A/S, Bjerringbro (DK)

(72) Inventors: Morten Sofussen, Aarhus C. (DK); Inger-Lise Volsgaard Jakobsen, Silkeborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 14/377,254

(22) PCT Filed: Jan. 17, 2013

(86) PCT No.: PCT/EP2013/050860
§ 371 (c)(1),
(2) Date: Aug. 7, 2014

(87) PCT Pub. No.: WO2013/117401
PCT Pub. Date: Aug. 15, 2013

(65) Prior Publication Data
US 2015/0022039 A1  Jan. 22, 2015

(30) Foreign Application Priority Data

Feb. 8, 2012  (EP) .................................. 12154489

(51) Int. Cl.
*H02K 11/00* (2016.01)
*G07C 3/00* (2006.01)
*G01P 13/04* (2006.01)

(52) U.S. Cl.
CPC ........... *H02K 11/001* (2013.01); *G01P 13/045* (2013.01); *G07C 3/00* (2013.01); *H02K 11/0094* (2013.01); *H02K 11/20* (2016.01); *H02K 11/21* (2016.01)

(58) Field of Classification Search
CPC ..... G01P 13/045; G07C 3/00; H02K 11/001; H02K 11/0015; H02K 11/0094; H02K 11/20; H02K 11/21
See application file for complete search history.

(56) References Cited

U.S. PATENT DOCUMENTS

| | | | |
|---|---|---|---|
| 5,237,310 A | 8/1993 | Smith | |
| 6,480,116 B1 * | 11/2002 | Wang | ........................ 340/815.53 |
| 2005/0088119 A1 * | 4/2005 | Potucek et al. | ................ 315/312 |
| 2005/0134014 A1 * | 6/2005 | Xie | ............................ 280/93.502 |
| 2005/0180146 A1 * | 8/2005 | VanderSchuit | ......... F21S 10/06 362/367 |

FOREIGN PATENT DOCUMENTS

| | | |
|---|---|---|
| JP | S57 144466 A | 9/1982 |
| JP | 2003 106292 A | 4/2003 |

\* cited by examiner

*Primary Examiner* — Sisay Yacob
(74) *Attorney, Agent, or Firm* — McGlew and Tuttle, P.C.

(57) ABSTRACT

An electric motor includes a signal device (5) for the display of at least two different operating conditions. For this, the signal device (5) includes six light diodes (A1-A6) which, with a running motor, are switched in a flashing manner synchronously to one another but shifted in time, so that they represent the rotational movement of the motor.

5 Claims, 5 Drawing Sheets

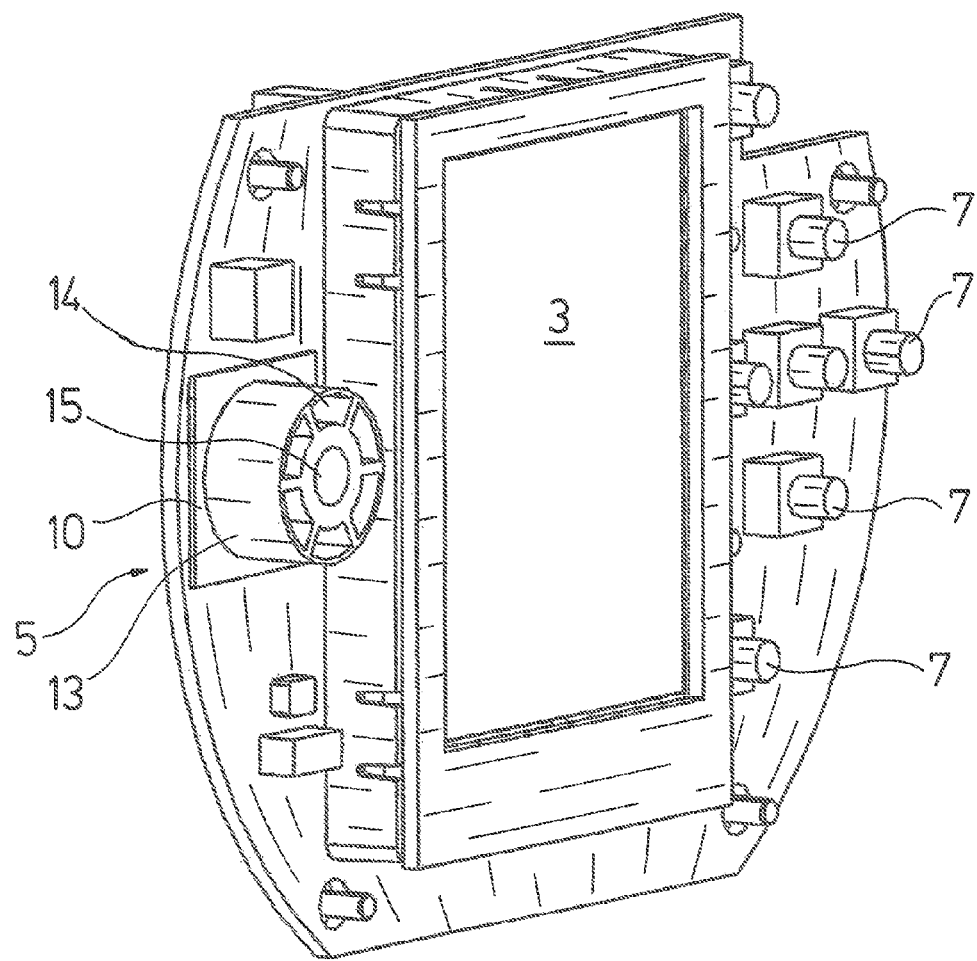

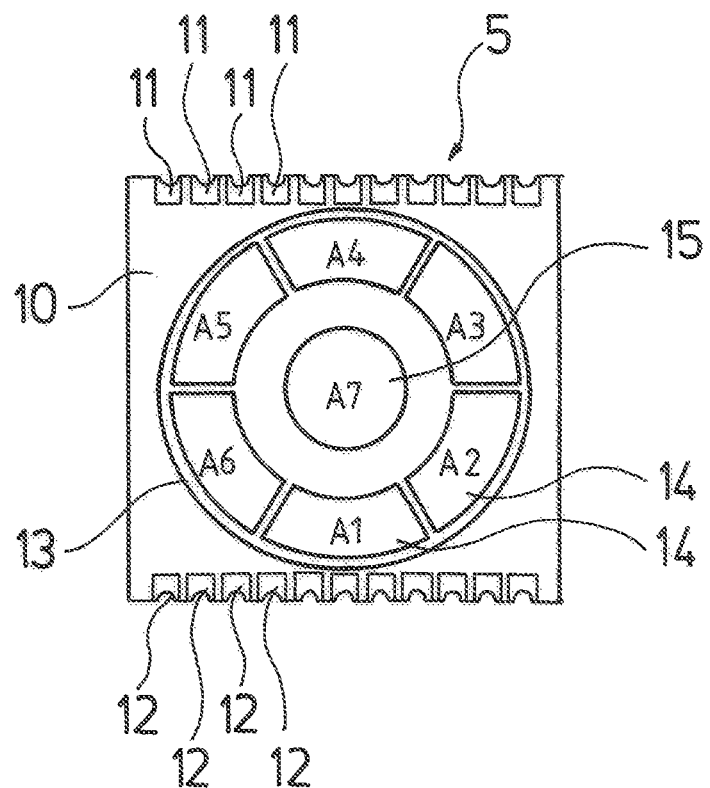
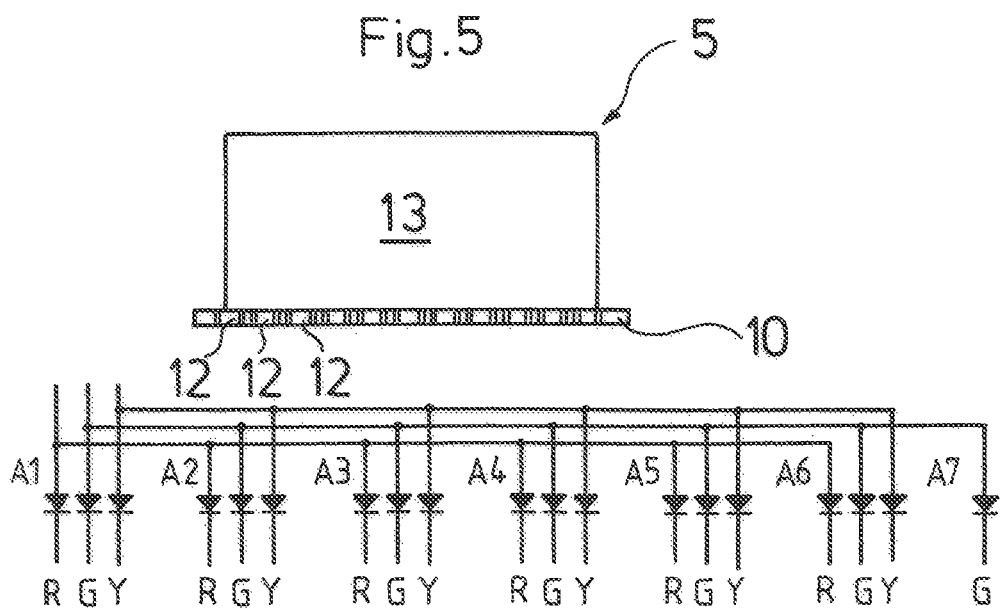

DISPLAY OPERATION CONDITIONS OF ELECTRIC MOTOR

CROSS REFERENCE TO RELATED APPLICATIONS

This application is a United States National Phase Application of International Application PCT/EP2013/050860 filed Jan. 17, 2013 and claims the benefit of priority under 35 U.S.C. §119 of European Patent Application EP 12154489.4 filed Feb. 8, 2012, the entire contents of which are incorporated herein by reference.

FIELD OF THE INVENTION

The invention relates to an electric motor with a signal device for a display of at least two different operating conditions of the motor, with at least one electrical illuminant which, with a running motor, is switched in a flashing manner.

BACKGROUND OF THE INVENTION

With electric motors, it is counted as belonging to the state of the art, to display different operating conditions of the motor with one or more illuminants Thus, for example, with centrifugal pumps driven by an electric motor, it is counted as belonging to the state of the art, to display the operation of the pump by way of a flashing light diode, wherein the flashing frequency can vary depending on the speed of the motor. It is regularly necessary to read the operating instructions, in which it is specified as to which light symbols correspond to which operating conditions, in order to detect the operating condition of such a motor. This is comparatively awkward since it requires the presence of the operating instructions and for the operator to look into this, which is disadvantageous.

With motors, it is counted as belonging to the state of the art, to indicate the operating condition of the running motor by way of a switched-on illuminant. However, there are also motors with which a flashing illuminant indicates the running condition of the motor. On the other hand, flashing functions of illuminants are often used to signal incorrect operating conditions, such as the standstill of the motor for example.

SUMMARY OF THE INVENTION

Against this state of the art, it is an object of the invention to design an electric motor of the known type, such that at least its operating condition can be recognized without further ado when the motor is running.

According to the invention, an electric motor is provided comprising a signal device for a display of at least two different operating conditions of the motor. The signal device comprises at least two electrical illuminants which, with a running motor, is switched in a flashing manner. The at least two illuminants are provided, with a running motor, are switched in a flashing manner synchronously to one another, but shifted in time.

The electric motor according to the invention comprises a signal device for the display of at least two different operating conditions of the motor. For this, an electric illuminant is provided, which is switched in a flashing manner with a running motor. According to the invention, at least two illuminants are provided, which with a running motor are switched in a flashing manner synchronously to one another, but in a time-shifted or staggered manner.

The basic concept of the present invention is to represent a movement condition by way of at least two illuminants, said operating condition directly indicating a running motor. With the at least two preferably more illuminants, it is possible to represent a movement if these are switched in a flashing manner synchronously to one another, but in a time-shifted manner. In particular with the use of several illuminants, one can create a type of running light which on the one hand has a significantly better recognizability that individual illuminants and one the other hand represents a movement, a flow or likewise, by way of which even the novice observer recognizes the operating condition of the running motor in a self-explanatory manner.

Basically, a movement effect can be represented with two illuminants arranged next to one another. Advantageously, such an effect however is represented with more than two, typically specifically with three or more illuminants, wherein in particular with motors which execute a rotation, as is the case with most electric motor applications, an annular arrangement of illuminants is useful, since then the rotation movement of the motor can be represented by way of these illuminants. If, as is advantageous, three or more illuminants are annularly arranged, then these according to a further development of the invention, when the motor is running, are switched in a flashing manner synchronously to one another but time-shifted. I.e. the light diodes either flash in a successive manner in the clockwise direction or in a successive manner in the anticlockwise direction. Thereby, a certain overlapping of the switch-on times can be advantageous, in order to achieve a natural appearance of the display, thus a natural appearance of the rotational movement to be symbolized. As to whether an overlapping is effected or not and in which cycle the flashing is effected, can be determined in a simple manner and is to be selected from case to case for the respective application purpose. Thus, a certain speed representation can be effected by way of different flashing speeds, i.e. with a slowly running motor a slow flashing is effected and a rapid flashing with a quickly running motor. In an analogous manner, the rotation direction of the motor can be represented with an annular arrangement, and a light running effect can be effected in the clockwise direction or in the anticlockwise direction, depending on whether the motor shaft rotates in the clockwise direction or in the anticlockwise direction.

It has been found that a particularly naturally and uniformly smoothly acting display can be achieved if six illuminants are arranged in an annular manner, which with a running motor are switched in a flashing manner synchronously to one another but successively time-shifted in pairs. With such an arrangement, in each case two diametrically oppositely lying illuminants arranged in the ring are switched on, or this switched-on illuminant pair travels in the rotational direction in a clockwise or anticlockwise manner, which creates a particularly good readability. Therefore, with a suitable arrangement of such a signal device on the motor, even from a large distance, one can ascertain whether this runs in a correct manner, and as the case may be, also in which direction and at which rotational speed, wherein typically tendencies with regard to speed, such as lower rotational speed, middle rotational speed and higher rotational speed can be displayed. The paired illuminant arrangement moreover has the advantage that with the failure of one illuminant, it is not the complete display that fails, but still remains in operation for this illuminant pair with one illuminant and also remains well recognizable.

Basically, the illuminants can be arranged in a triangular, oval, rectangular or square ring or in another ring shape. However, they are particularly well recognizable if they are arranged in an annular manner.

With the simultaneous activation of two illuminants, it is particularly advantageous if these are arranged diametrically, since this helps with the recognition ability and the natural representation of a rotation movement.

Advantageously, a central illuminant can be arranged within the illuminant ring, according to a further development of the invention. This central illuminant can for example serve to represent the switch-on condition, i.e. to represent whether the electric motor is switched on or not or whether voltage prevails at the electric motor or not. Alternatively, a remote control condition or another operating characteristic can be displayed with this.

If further operating conditions are to be displayed, such as for example temperature, pressure or likewise, it can be necessary or useful to provide further illuminants for this. According to an advantageous further development of the invention, these illuminants are then arranged within one or more preferably concentric rings. Such an arrangement on the one hand is optically pleasant and on the other hand is space-saving.

Advantageously, the switching of the illuminants is effected such that at least one illuminant or illuminant pair is permanently switched on when the motor is switched on at standstill. It is particularly with an annular arrangement of the illuminants or illuminant pairs that one can recognizably symbolize that the motor is at standstill.

Alternatively or additionally, according to a further development of the invention, also only one illuminant or illuminant pair can be switched with a simultaneous flashing when the motor is at standstill with the motor switched on. This is usefully switched when the stationary motor function is not correct, thus for example with a stuck rotor or an overload condition.

Basically, different illuminants can be applied for the electric motor according to the invention, but it is however particularly advantageous to design all illuminants as light diodes, since these are inexpensively available, have low energy consumption and operate in a stable manner over the longer term.

According to one advantageous further formation, the operating condition characterization is not only effected by way of representation of the motor movement but preferably additionally by way of color representations. For this, according to a further development of the invention, three-color light diodes are provided, preferably in the colors red, green and yellow. Alternatively, such three-color light diodes can also be formed by three individual light diodes. The colors red, green and yellow are self-explanatory and correspond to the international traffic light characterization, thus with a suitable application can represent self-explanatory operating conditions. Thereby, the light diodes are preferably switched green for correct operating conditions of the motor. Advantageously, the light diodes are switched red for incorrect operating conditions of the motor. The switching of the yellow light diodes can be applied for operating conditions which are only just correct, but not for long. Thus, for example, with a brief overload of the motor, this can be symbolized by the switching-on of the yellow light diodes, wherein after exceeding the reliable loading time, finally the red light diodes are then switched on, in order to characterize the incorrect operating condition or the imminent switching-off of the motor.

Advantageously, the illuminants for the display of the operating conditions are attached on an end-side of the motor housing, but these can however also be attached at any other location or also remotely to the motor. Thus, according to a further development of the invention, it is conceivable for the described arrangement of illuminants for the display of different operating conditions, not to be arranged on the motor but additionally or also exclusively on the operating part which as the case may be is connected in a wireless manner.

Particularly advantageously, the electric motor according to the invention with its signal device for the display of the operational condition is applied in combination with a centrifugal pump assembly, wherein the illuminants are arranged on the end-side which is away from the pump and arranged transversely to the motor axis or on a terminal box arranged on the motor. Particularly advantageously, such a signal device is to be applied with so-called wet-runners, i.e. with motors, in particular of circulation pumps, with which the rotor runs in a can which is filled with fluid and with which therefore typically the rotating parts of the motor are not visible. It is indeed with such motors that the provision of such an operating condition display is advantageous, in order to render the motor condition, in particular the movement of the rotor visible. Thus, advantageously, one can provide a signal device of the previously described type with heating circulation pumps or other circulation pumps. Such a signal device is particularly advantageous at locations which are poorly accessible or are inadequately lit, as is often the case for example in heating cellars, pump sumps, sewage lifting installations and likewise. In particular with these applications, such a self-explanatory signal device is advantageous since operating instructions are mostly not accessible or at least are poorly visible and prints on the assembly themselves can often suffer damage due to the often harsh environmental influences to which they are exposed.

The signal device for the display of at least two different operating conditions of the motor is represented by way of an embodiment example shown in the drawing, and this embodiment example by way of example shows a signal device on the terminal box of a motor. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a perspective view showing a circuit board comprising the signal device, a display and switch means;

FIG. 4 is a plan view of the signal device;

FIG. 5 is a lateral view of the signal device;

FIG. 6 is an electrical circuit diagram of the signal device;

DESCRIPTION OF THE PREFERRED EMBODIMENTS

Figure 1:
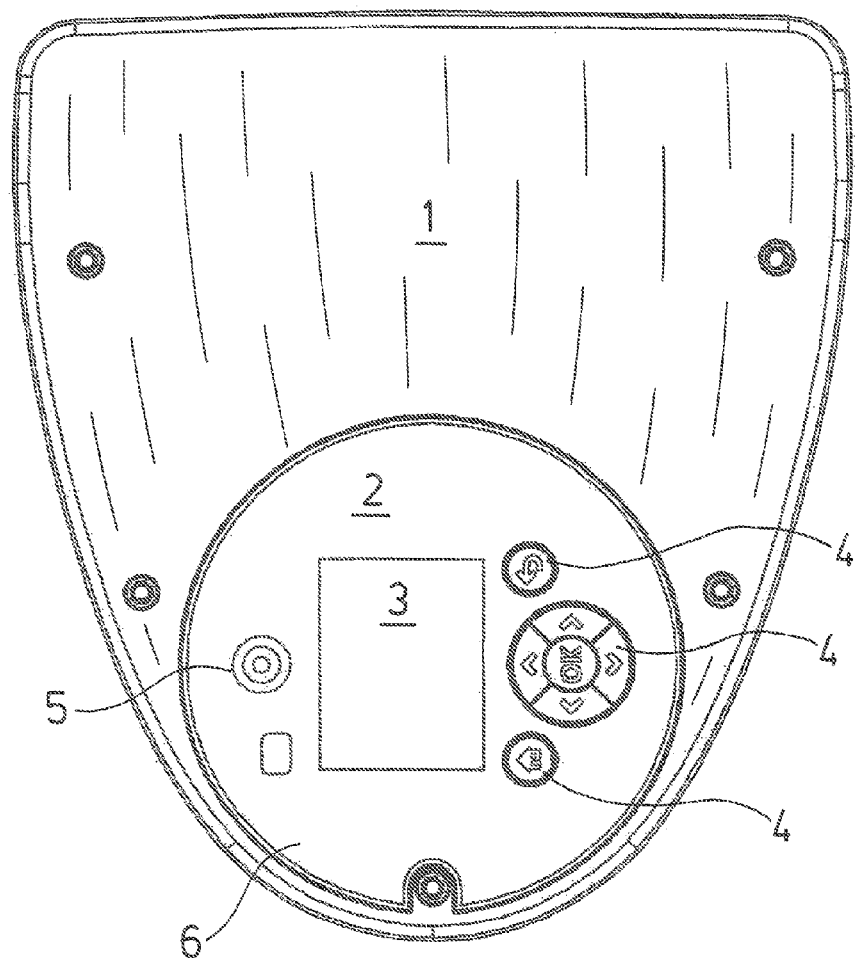
FIG. 1 is an end view of a terminal box of an electric motor.

Referring to the drawings in particular, the terminal box represented in FIG. 1 is arranged on the one end-side of an electric motor which is not shown here and at whose other end the motor shaft exits. The terminal box 1 projects beyond the motor not only at the end-side, but also radially, and contains an electronic speed controller as is counted as belonging to the state of the art with modern electric motors.

Figure 2:
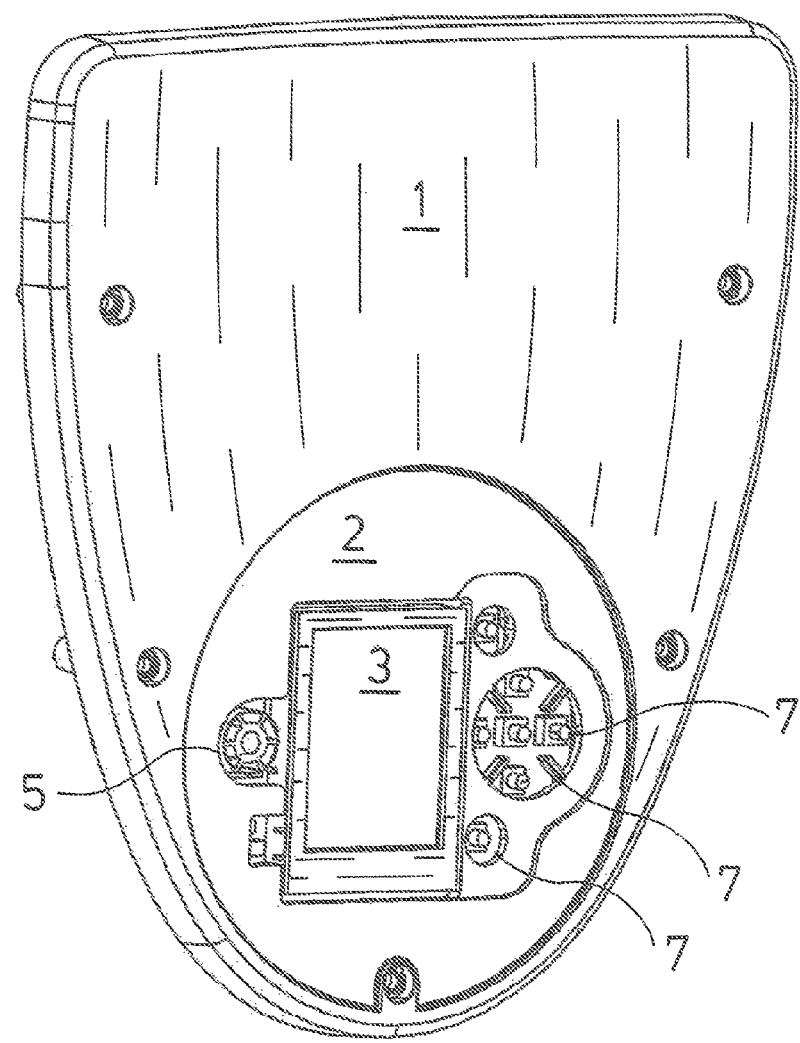
FIG. 2 is a perspective view according to FIG. 1, with a partly removed cover film.

A display and operating field 2 is provided on the terminal box 1, with a display 3 with pressure-sensitive operating panels 4 as well as with a signal device 5. The function of the display 3 and operating panel 4 are not to be dealt with here in detail, and it is the case of common menu-guided operating units as have been known for some time from the state of the art. As in particular FIGS. 2 and 3 illustrate, they consist of several buttons 7 which are arranged below a film 6 and lie in a protected manner below the film 6 and can be operated through this film. The display 3 is also protected by the film 6 which is transparent in this region. The signal device 5 is also covered by a transparent part of the film and specifically such that a central window 8 and an annular window 9 surrounding this at a distance are formed over the signal device 5, which are transparent, whereas the remaining part is designed in a covered, i.e. opaque manner.

The signal device 5 is represented in detail by way of FIGS. 4-6. The signal device 5 comprises a circuit board 10, on which light diodes A1-A6 are arranged in an annulus-shaped arrangement 6. The light diodes are three-color light diodes with the colors red (R), green (G) and yellow (Y). They are arranged in a common cast housing, as is counted as belonging to the state of the art, but seen electrically they consist of three individual diodes for each of the mentioned colors. A further light diode A7 is arranged in the center of the annular arrangement and is single-colored and is green.

The light diodes are soldered onto the upper side of the circuit board 10 which is partly visible in FIG. 4 and are led out by strip conductors on the circuit board to lateral connection contacts 11 and 12. As is evident by way of FIG. 4, contacts 11 are led out at one side of the circuit board 10 and contacts 12 which are provided for the connection of the light diodes A1-A7 are led out at the other side, lying opposite and away from the first mentioned side. Of the contacts 11 and 12, in each case one is assigned to an earth contact whilst the others are assigned to the light diodes A1-A7, which results in the occupation of ten contacts 11 and nine contacts 12.

An annular plastic component 13 is placed on the circuit board 10 and in the annular region which is arranged below the central window 8, comprises six segments 14 as well as a central recess 15. Each of the segments 14 receives one of the three-color light diodes A1-A6, and the central recess 15 receives the single-colored light diode A7. The segments 14 and the central recess 15 are cast with a transparent plastic up to the upper side, so that in the installed condition, a uniform light effect in the associated segment results when switching on one of the diodes A1-A6 for example.

Figure 8:
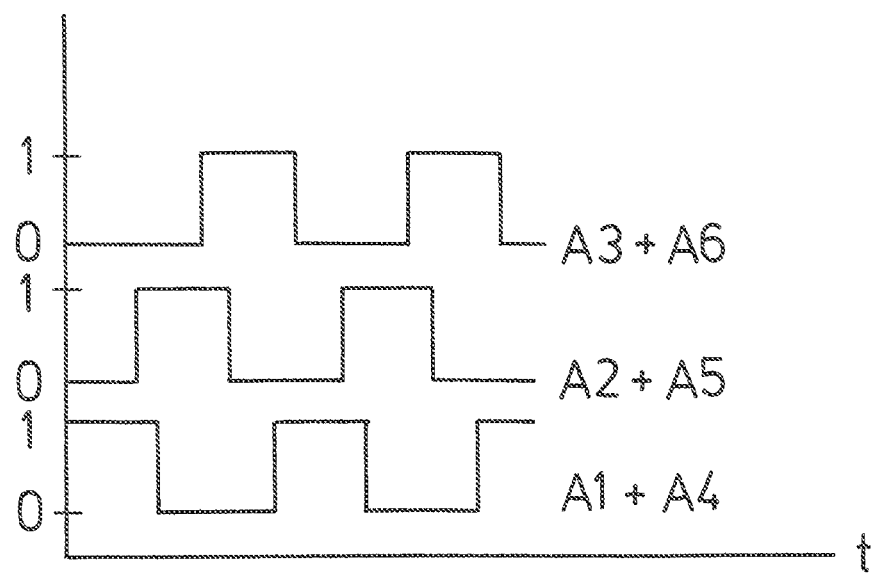
FIG. 8 is a circuit diagram in a representation according to FIG. 7, with overlapping switch-on times.
Figure 7:
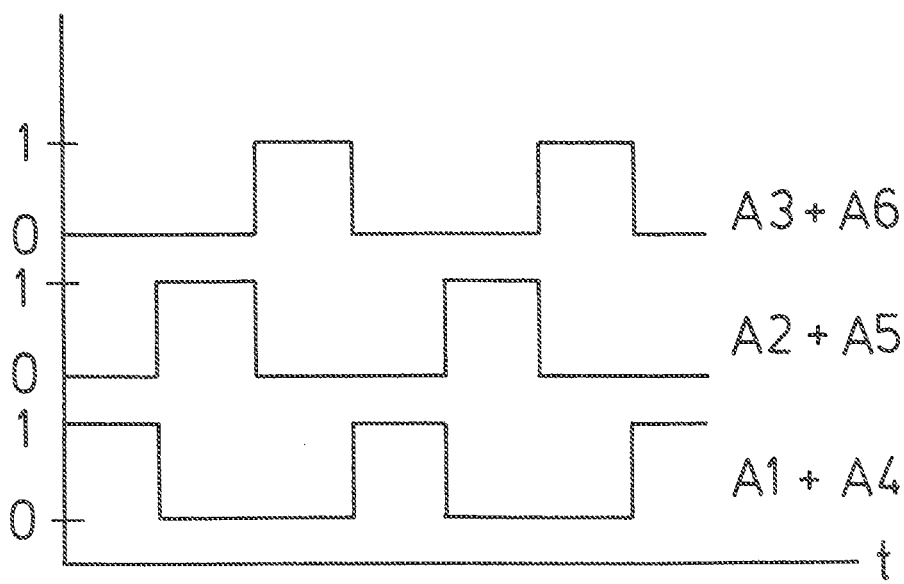
FIG. 7 is diagram which represents the switch-on times of the annularly arranged illuminants to one another.

This signal device 5, at a suitable location can be arranged on quasi infinite circuit boards or also other connection components and must be connected by way of the contacts 11-12 to the respective control apparatus. FIG. 7 represents how the annularly arranged light diodes A1-A6 are activated, in order to indicate an anticlockwise rotating motor. Thereby, the light diodes A1-A6 are activated in each case in pairs and specifically lying opposite in pairs, i.e. the light diode A1 lights up (condition 1) simultaneously with the light diode A4, and the light diode A2 with the light diode A5 , and the light diode A3 with the light diode A6. Beginning with the light diode pair A1, A4 which is switched on for 0.4 seconds for example, directly subsequent to this (FIG. 7) or in a slightly overlapping manner (FIG. 8) the light diode pair A3, A6 is likewise subsequently switched-on for 0.4 seconds. After these 0.4 seconds or shortly overlapping this, the light diode pair A2, A5 is switched-on, again for 0.4 seconds, and after its completion the cycle is repeated with the switching-on of the light diode pair A1, A4. In this manner the impression of a body rotating in the anticlockwise direction results, in a accordance with the motor which then rotates anticlockwise.

With a clockwise rotating motor, the switching-on and switching-off of the light diodes is effected in the reverse sequence as that previously described. Moreover, at least a rough indication with regard to the rotational speed range can be given via the switch-on duration. Thus, for example, three different switch-on durations 0.4, 0.6 and 0.8 seconds can be envisaged, wherein the switch-on duration of 0.8 seconds represents a lower speed range, the switch-on durations of 0.6 seconds a middle speed range and the switch-on duration of 0.4 seconds a high speed range.

Exclusively, the green light diodes A1-A6 are switched with a correctly running operation and the red and yellow light diodes remain inactive. With a stationary rotor and a switched-on voltage supply in each case only a pair of green light diodes A1-A6 light up. The yellow light diodes are envisaged for a so-called "warning mode" and with a running motor are usefully activated one after the other such that these light up in a revolving manner in a paired manner or individually, so that from the outside one can immediately clearly see that the motor has reached a condition which can be operated for example only temporarily. The red light diodes are basically only envisaged for unallowable operating conditions, for example if the pump runs in the overload range or becomes unallowable warm. The red light diodes signalize that the pump is very shortly before the preferably automatically effected switching-off. The red light diodes can also light up in a revolving or stationary manner, or flash, in an individual or paired manner, depending on the condition of the pump.

The central green diode is here provided for the display of a control mode which signalizes that the motor runs in the remote control mode, i.e. for example in a combination with several motors, as this is common with pump assemblies in larger installations or also in an individual configuration per remote control.

While specific embodiments of the invention have been shown and described in detail to illustrate the application of the principles of the invention, it will be understood that the invention may be embodied otherwise without departing from such principles.

The invention claimed is:
1. An electric motor comprising:
a signal device for displaying at least two different operating conditions of the electric motor, the signal device comprising a first electrical illuminant, a second electrical illuminant and a third electrical illuminant, said first electrical illuminant being arranged between said second electrical illuminant and said third electrical illuminant in a circumferential direction of the signal device, wherein at least said first electrical illuminant, said second electrical illuminant and said third electrical illuminant define an annular arrangement of electrical illuminants, wherein said annular arrangement of electrical illuminants, with the electric motor running, are switched in a flashing manner, wherein at least the first electrical illuminant, the second electrical illuminant and the third electrical illuminant, with the electric motor running are switched in a flashing manner synchronously to one another, but successively shifted in time such that at least the first electrical illuminant, the second electrical illuminant and the third electrical illuminant are illuminated immediately one after another to define an illumination of said annular arrangement of electrical illuminants in said circumferential direction, wherein said illumination of said annular arrangement of electrical illuminants in said circumferential direction corresponds to at least one of a rotational speed of the electric motor and a status of the electric motor.

2. The electric motor according to claim 1, wherein each of the illuminants is in a fixed position such that each of the illuminants do not rotate relative to the electric motor.

3. The electric motor according to claim 1, wherein the first electrical illuminant, the second electrical illuminant, and the third electrical illuminant are light diodes formed by three-color light diodes, comprising the colors red, green and yellow, wherein the light diodes are switched green with correct operating conditions of the electric motor, wherein the light diodes are switched red with non-correct operating conditions of the electric motor.

4. The electric motor according to claim 1, in combination with a centrifugal pump assembly wherein the illuminants are arranged on an end-side which is arranged away from the centrifugal pump assembly and transversely to the electric motor axis, or on a terminal box arranged on the electric motor.

5. An electric motor comprising:
a signal device for displaying at least two different operating conditions of the electric motor, the signal device comprising a first electrical illuminant, a second electrical illuminant a third electrical illuminant and a fourth electrical illuminant, at least said first electrical illuminant, said second electrical illuminant, said third electrical illuminant and said fourth electrical illuminant defining an annular arrangement of electrical illuminants, wherein said first electrical illuminant is arranged diametrically opposite said fourth electrical illuminant and said second electrical illuminant is arranged diametrically opposite said third electrical illuminant, said first electrical illuminant being arranged directly adjacent to said second electrical illuminant with respect to a circumferential direction of said annular arrangement of said electrical illuminants, said fourth electrical illuminant being arranged directly adjacent to said third electrical illuminant with respect to the circumferential direction of said annular arrangement of said electrical illuminants, wherein said first electrical illuminant and said fourth electrical illuminant, with the electric motor running, are switched together at the same time in a flashing manner, and said second electrical illuminant and said third electrical illuminant are switched together at the same time in a flashing manner immediately after the first electrical illuminant and said fourth electrical illuminant are synchronously switched to define an illumination of said annular arrangement of electrical illuminants in said circumferential direction, wherein said illumination of said annular arrangement of electrical illuminants in said circumferential direction corresponds to at least one of a rotational speed of the electric motor and a status of the electric motor.

* * * * *